(12) United States Patent
Choi

(10) Patent No.: US 9,530,584 B2
(45) Date of Patent: Dec. 27, 2016

(54) COMMON SWITCH DEVICE FOR VEHICLE

(71) Applicant: HYUNDAI MOTOR COMPANY, Seoul (KR)

(72) Inventor: Yong Hwa Choi, Jeollabuk-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/537,573

(22) Filed: Nov. 10, 2014

(65) Prior Publication Data

US 2015/0243454 A1 Aug. 27, 2015

(30) Foreign Application Priority Data

Feb. 21, 2014 (KR) ........................ 10-2014-0019968

(51) Int. Cl.
| | | |
|---|---|---|
| *H01R 12/00* | (2006.01) | |
| *H01H 9/02* | (2006.01) | |
| *B60K 37/06* | (2006.01) | |
| *B60K 35/00* | (2006.01) | |
| *H01H 13/81* | (2006.01) | |

(52) U.S. Cl.
CPC ............ *H01H 9/0271* (2013.01); *B60K 35/00* (2013.01); *B60K 37/06* (2013.01); *B60K 2350/1016* (2013.01); *H01H 13/81* (2013.01); *H01H 2207/022* (2013.01); *H01H 2207/04* (2013.01); *H01H 2231/016* (2013.01); *H01H 2233/002* (2013.01)

(58) Field of Classification Search
CPC .............. H01R 13/6658; H01R 13/518; H01R 23/7073; H01R 33/92; H01R 35/04; H01R 13/514; H01H 11/042; H01H 1/5805

USPC ........ 439/76.1, 540.1, 541.5, 639, 640, 701; 200/238, 292

See application file for complete search history.

(56) References Cited

U.S. PATENT DOCUMENTS

| | | | | |
|---|---|---|---|---|
| 4,616,112 A | * | 10/1986 | Galloway | ............ H01H 15/005 200/16 D |
| 6,778,401 B1 | * | 8/2004 | Yu | .................... G06K 19/07732 361/736 |
| 6,846,997 B2 | * | 1/2005 | Koyasu | ................ B60Q 1/1461 200/292 |
| 7,520,775 B2 | * | 4/2009 | Wu | ........................ H01H 1/365 200/16 C |
| 8,105,094 B2 | * | 1/2012 | Patel | .................... H01Q 1/2233 439/535 |
| 8,998,620 B2 | * | 4/2015 | Ni | ......................... H01R 12/71 361/737 |

FOREIGN PATENT DOCUMENTS

| | | |
|---|---|---|
| JP | 3171312 B2 | 6/1997 |
| JP | 10-106670 A | 4/1998 |

(Continued)

*Primary Examiner* — Thanh Tam Le
(74) *Attorney, Agent, or Firm* — McDermott Will & Emery LLP

(57) ABSTRACT

A common switch device for a vehicle capable of serving as a communicative switch module and a non-communicative switch module includes a switch module including a plurality of common switches. A connector module is detachably coupled with the switch module. The connector module includes a housing installed with a printed circuit board (PCB) in which a communication chip is built in. A plurality of connectors mounted on the PCB, each being connected to one of the common switches of the switch module, and separately connected to the communication chip.

3 Claims, 4 Drawing Sheets

(56) References Cited

FOREIGN PATENT DOCUMENTS

| | | |
|---|---|---|
| JP | 2003-197321 A | 7/2003 |
| KR | 10-2011-0049552 A | 5/2011 |
| KR | 20-0465882 Y1 | 3/2013 |
| WO | 2012/099274 A1 | 7/2012 |

* cited by examiner

COMMON SWITCH DEVICE FOR VEHICLE

CROSS-REFERENCE TO RELATED APPLICATION

This application claims under 35 U. S. C. §119(a) the benefit of priority to Korean Patent Application No. 10-2014-0019968 filed on Feb. 21, 2014, the entire contents of which are incorporated herein by reference.

TECHNICAL FIELD

The present disclosure relates to a common switch device for a vehicle. More particularly, it relates to a common switch device for a vehicle capable of serving as a communicative switch module and a non-communicative switch module.

BACKGROUND

A large truck employs about thirty switches, when full options are applied to the large truck, for various gadgets, safety devices, and regulations. In recent years, in order to prevent thickness of wires from being increased by adding a number of switches and to change the positions of the switches, a communicative switch module is being employed.

The communicative switch module maximizes productivity of a vehicle but is very disadvantageous in view of manufacturing costs. Thus, there is a practical limit to replace all switches of the vehicle with communicative switches.

Considering the productivity of a vehicle and the manufacturing costs, it is advantageous to apply the communicative switch module and a non-communicative switch module selectively according to importance of a system.

The existing communicative switch module includes high price communication chips (for example, semiconductors including a CAN transceiver, a CAN controller, etc.) installed in various communicative switches and is manufactured separately from the non-communicative switch performing ON/OFF functions using a mechanical contact structure.

SUMMARY

The present disclosure has been made in an effort to solve the above-mentioned problems. An aspect of the present disclosure provides a common switch device for a vehicle made by taking productivity manufacturing costs of the vehicle and capable of being selectively used as a communicative switch module and a non-communicative switch module.

In accordance with an exemplary embodiment of the present disclosure, a common switch device for a vehicle includes a switch module including a plurality of common switches. A connector module is detachably coupled with the switch module. The connector module includes a housing installed with a printed circuit board (PCB) in which a communication chip is built in. A plurality of connectors are mounted on the PCB, each being connected to one of the common switches of the switch module, and are separately connected to the communication chip.

The communication chip receives an electric signal passed through an ID resistor that is installed in the common switches, and distinguishes and recognizes an operated switch of the plurality of common switches from non-operated switches when the common switch is operated.

The PCB has an output connector to output an electric signal from the communication chip to the outside.

Each of the connectors includes a plurality of terminals connected to terminals of the common switches and has a bending structure to be elastically connected to the terminals of the common switches when the common switches are connected to the connectors.

The common switch device for a vehicle according to the present disclosure enables to selectively use the switch module as the communicative switch module and the non-communicative switch module by selectively applying the connector module so that all of productivity and manufacturing costs of a vehicle can be enhanced, and the degree of freedom for design can be also improved.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention.

Figure 1:
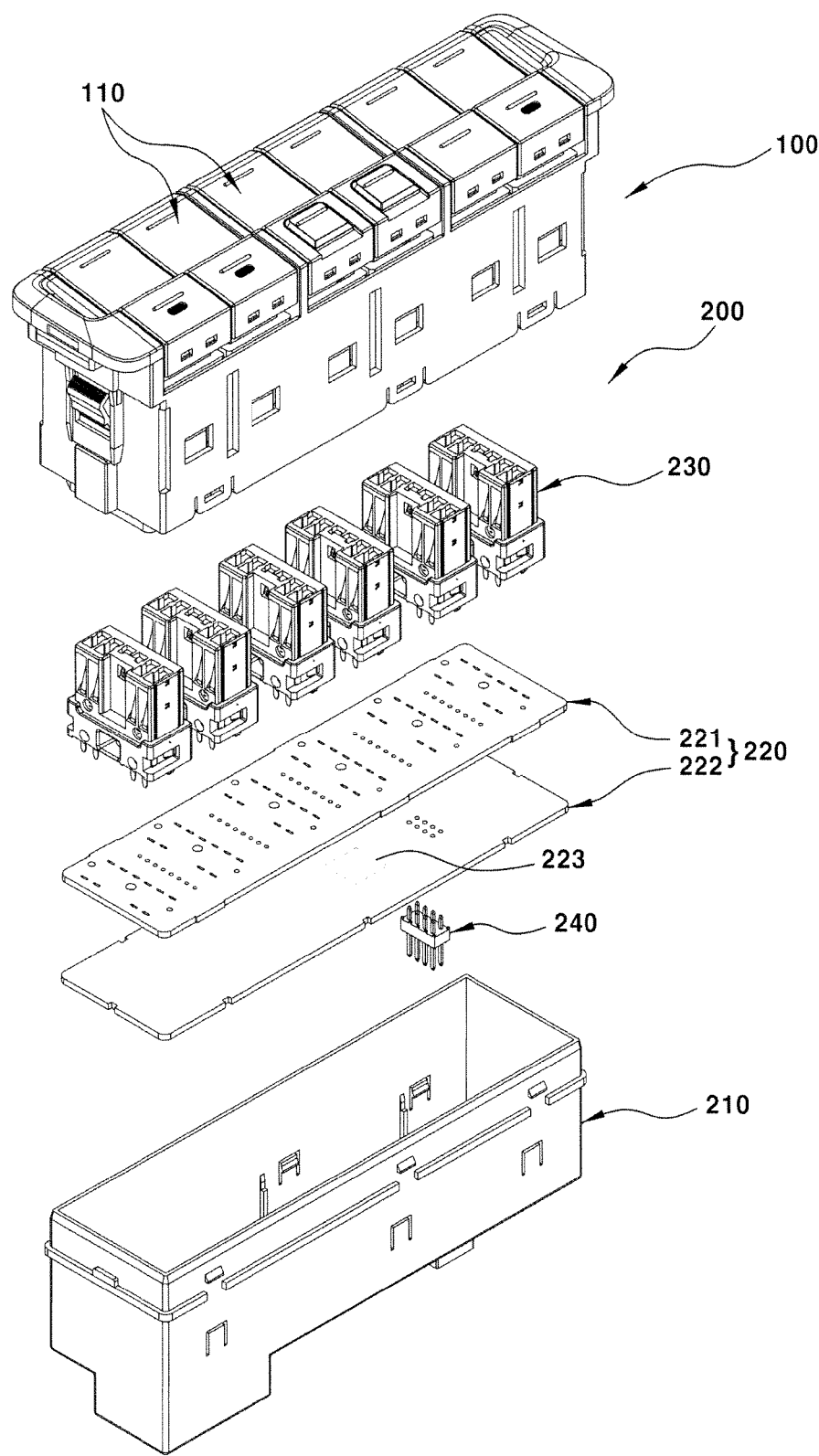
FIG. 1 is an exploded perspective view illustrating a common switch device for a vehicle according to an embodiment of the present disclosure.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, the present disclosure will be described in detail so that those skilled in the art to which the present disclosure pertains can easily carry out the invention.

The present disclosure relates to a common switch device for a vehicle with taking productivity and the manufacturing costs of the vehicle into consideration, and more particularly, to a common switch device for a vehicle capable of selectively using a communicative switch module and a non-communicative switch module.

Figure 2:
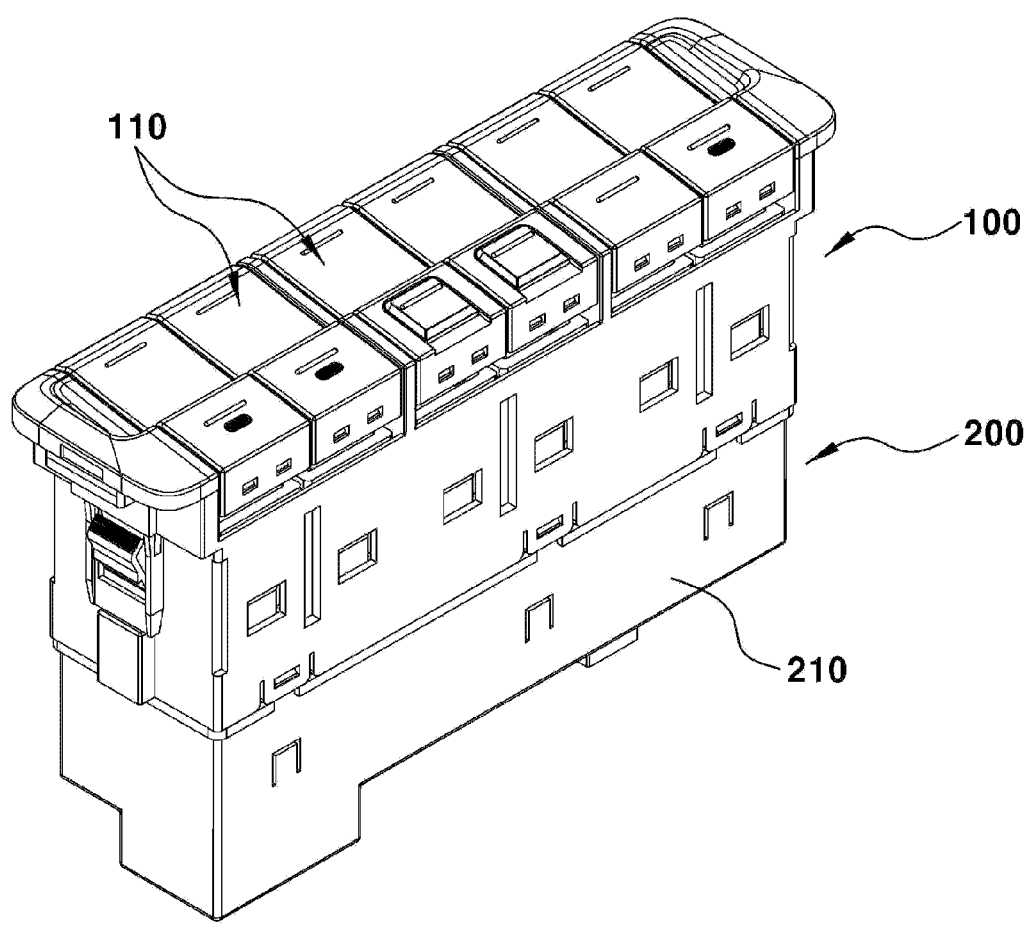
FIG. 2 is a perspective view showing an assembly of the common switch device for a vehicle according to an embodiment of the present disclosure.

As illustrated in FIGS. 1 and 2, a common switch device for a vehicle according to an embodiment of the present disclosure includes a switch module 100 and a connector module 200.

The switch module 100 includes a plurality of common switches 110 serving as communicative switches and non-communicative switches, respectively. Though not shown in the drawings, each of the common switches 110 has one or more ID resistors (not shown) installed therein to serve as a communicative switch.

Here, the common switches 110 have ID resistors with different resistances. Each of the ID resistors provides communication IDs to the respective common switches 110 and is conducted when the common switches 110 are switched on so that current (an electric signal) passed through the ID resistors flows toward a later-described communication chip 223 via a connector 230 when the common switch 110 is switched on.

Figure 3:
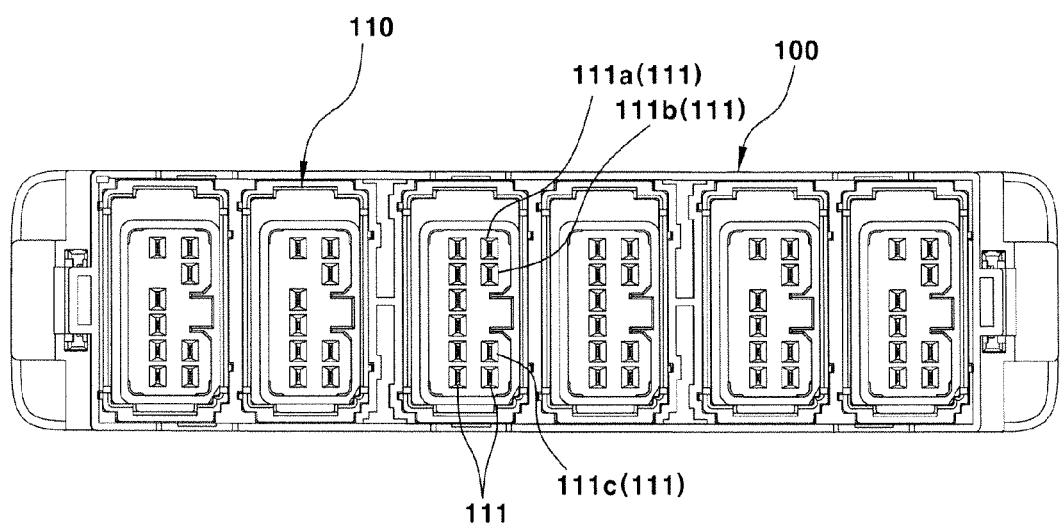
FIG. 3 is a bottom view illustrating a switch module according to an embodiment of the present disclosure.
Figure 4:
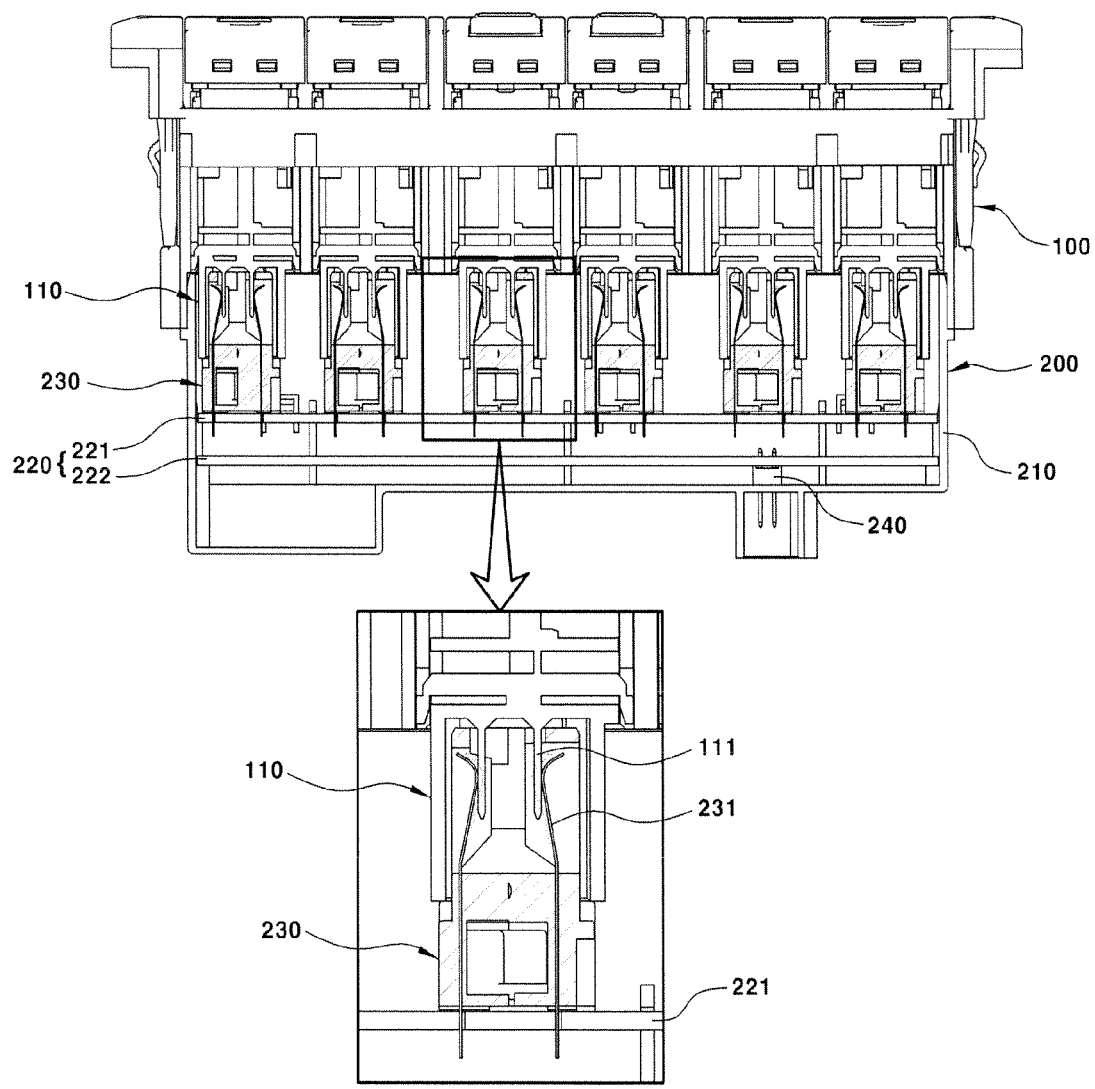
FIG. 4 is a sectional view illustrating a connection structure between a common switch and a connector according to an embodiment of the present disclosure.

The respective common switches 110 may be general switches that are switched on/off by internal mechanical contact structures and include a plurality of terminals 111 connected to terminals 231 of a plurality of connectors 230 as illustrated in FIGS. 3 and 4.

In each of the common switches 110, terminals 111a, 111b, and 111c among the plurality of terminals 111 are electrically connected to the ID resistors, and electric signals passing through the ID resistors via the terminals 111a, 111b, and 111c are transferred to the connectors 230 connected thereto.

Referring to FIG. 3, a first terminal 111a and a second terminal 111b of the terminals 111 of the common switches 110 may be connected to a first ID resistor and the first terminal 111a, and a third terminal 111c may be connected to a second ID resistor.

As illustrated in FIG. 1, the connector module 200 includes a housing 210 in which a printed circuit board (PCB) 220 mounted with a single communication chip 223 is installed and a plurality of connectors 230 installed on the PCB 220. The respective connectors 230 are mounted on the PCB 220 without an electrical connection therebetween and are electrically connected with the communication chip 223 of the PCB 220 separately.

Each of the connectors 230 is electrically connected to any one of the common switches 110 of the switch module 100 provided at corresponding locations when the switch module 100 and the connector module are coupled with each other.

The communication chip 223 is a communication semiconductor performing functions of a wired transceiver (or a CAN transceiver) and a wired controller (or a CAN controller) and is provided on a side of the PCB 220.

The communication chip 223 receives the electric signals from the common switches 110 transmitted via the respective connectors 230 to distinguish an operating one of the plurality of common switches 110 from non-operating switches and to transmit an operating signal (electric signal) of the operating switch to a corresponding device (switched on/off by the operating switch).

The PCB 220 includes an output connector 240 installed at a side to transmit an output signal (electric signal) of the communication chip 223. The output connector 240 transmits the output signal of the communication chip 223 to a corresponding device such that the corresponding device may be switched on/off.

The PCB 220 may include a first circuit board 221 and a second circuit board 222, such that the connectors 230 may be installed on the first circuit board 221, and the communication chip 223 and the output connector 240 may be installed on the second circuit board 222.

In this case, the first circuit board 221 and the second circuit board 222 are formed with desired electric circuits to connect the connectors 230 of the first circuit board 221 and the communication chip 223 of the second circuit board 222.

As illustrated in FIG. 4, each of the connectors 230 includes a plurality of terminals 231 connected to the terminals 111 of the common switches 110. Each of the terminals 231 has a bending structure such that elastically connected to the terminals 111 of the common switches 110 when the common switches 110 are connected to the connectors 230.

The terminals 231 of the respective connectors 230 have the bending structure so that assembly tolerance occurred at the connection with the terminals 111 of the common switches 110 may be allowed.

Thus, even when the assembly tolerance occurs between the common switches 110 and the connectors 230, the connections between terminals 111 and 231 may be stable.

The common switches 110 of the switch module 100, as illustrated in FIG. 2, may be selectively used as communicative switches when the connector module 200 is connected thereto and non-communicative switches, although not depicted in the drawings, when the connector module 200 is separated and a general wired connector (not shown) is connected thereto.

Operations of the common switch device in which the connector module 200 is connected to the switch module 100 will be described.

When any one of the plurality of common switches 110 provided in the switch module 100 is pressed to operate, a mechanical contact structure in the corresponding common switch is connected to conduct, and current (an electric signal) flows through an ID resistor of the operated common switch. The electric signal passing through the ID resistor is transmitted to the communication chip 223 via the connector connected to the operated common switch.

The communication chip 223 recognizes the operated one of the common switches 110 of the switch module 100 through the electric signal passed through the ID resistor of the common switch and transmits the electric signal to the outside via the output connector 240.

The electric signal outputted through the output connector 240 is transmitted to a device connected to the corresponding common switch to operate such that the corresponding device is driven.

Although the present invention has been described in detail until now, the scope of the present invention is not limited to the description but various modifications made by those skilled in the art using the basic concept of the present invention defined by the claims also fall within the scope of the present invention.

What is claimed is:

1. A common switch device for a vehicle, comprising:
   a switch module having a plurality of common switches; and
   a connector module detachably coupled with the switch module;
   wherein the connector module comprises:
      a housing installed with a printed circuit board (PCB) in which a communication chip is built in; and
      a plurality of connectors mounted on the PCB, each being connected to one of the common switches of the switch module, and separately connected to the communication chip,
   wherein an output connector is mounted on the PCB to output an electric signal from the communication chip to the outside, and
   wherein the plurality of connectors are mounted on a first circuit board of the PCB, and the output connector and the communication chip are mounted on a second circuit board of the PCB.

2. The common switch device of claim 1, wherein the communication chip receives an electric signal passed through an ID resistor that is installed in the common switches, and distinguishes and recognizes any operated one of the plurality of common switches from other non-operated common switches when the common switch is operated.

3. The common switch device of claim 1, wherein each of the connectors includes a plurality of terminals connected to terminals of the common switches and has a bending structure to be elastically connected to the terminals of the common switches when the common switches are connected to the connectors.

* * * * *